(12) United States Patent
Itoh

(10) Patent No.: US 7,646,396 B2
(45) Date of Patent: Jan. 12, 2010

(54) APPARATUS AND METHOD FOR DISPLAYING IMAGE

(75) Inventor: Fumiaki Itoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 10/944,865

(22) Filed: Sep. 21, 2004

(65) Prior Publication Data
US 2005/0035944 A1 Feb. 17, 2005

(30) Foreign Application Priority Data
Oct. 3, 2003 (JP) ............................... 2003-346142

(51) Int. Cl.
*G09G 5/36* (2006.01)
(52) U.S. Cl. .................. 345/676; 345/474; 345/545
(58) Field of Classification Search ................ 345/157, 345/676, 734, 736, 737, 738, 760, 764, 771, 345/775, 839, 848, 850, 854, 119, 123, 474, 345/545
See application file for complete search history.

(56) References Cited

U.S. PATENT DOCUMENTS

| | | | | |
|---|---|---|---|---|
| 5,621,430 A * | 4/1997 | Bricklin | ...................... | 715/856 |
| 6,121,970 A * | 9/2000 | Guedalia | .................... | 715/760 |
| 6,295,133 B1 * | 9/2001 | Bloomquist et al. | .......... | 358/1.1 |
| 6,449,639 B1 * | 9/2002 | Blumberg | .................... | 709/217 |
| 6,650,343 B1 * | 11/2003 | Fujita et al. | .................. | 715/760 |
| 6,708,309 B1 * | 3/2004 | Blumberg | .................... | 715/530 |
| 2002/0067374 A1 * | 6/2002 | Kenyon | ....................... | 345/764 |
| 2004/0046760 A1 * | 3/2004 | Roberts et al. | .............. | 345/474 |
| 2004/0148412 A1 | 7/2004 | Itoh et al. | .................... | 709/229 |
| 2004/0155890 A1 * | 8/2004 | Andert et al. | ............... | 345/684 |

FOREIGN PATENT DOCUMENTS

| | | |
|---|---|---|
| JP | 2000-217022 | 8/2000 |
| JP | 2002-140731 | 5/2002 |

OTHER PUBLICATIONS

U.S. Appl. No. 09/144,528, filed Aug. 31, 1998.
Hideyuki Fujita, et al., "Use of Photographs as Spatial Data based on a Photo Vector Field Model", Proceedings fo DBWeb2002, IPSJ Symposium Series, vol. 2002, No. 19, pp. 33-39. (Concise explanation of relevance included).

* cited by examiner

*Primary Examiner*—Amare Mengistu
*Assistant Examiner*—Aaron M Guertin
(74) *Attorney, Agent, or Firm*—Fitzpatrick, Cella, Harper & Scinto

(57) ABSTRACT

In an environment in which a plurality of landscape images are held at distributed locations, virtual walkthrough is implemented by making display transition to another landscape image obtained by sensing a landscape that neighbors a displayed landscape upon displaying an image of a given landscape.

13 Claims, 23 Drawing Sheets

FIG. 2

```
<geoimg src="http://server1/img1.jpg">  ~201
  <include geoimg="http://server2/img2.gim"> ~202
    <center x="400" y="280"> ~203
  </include>
</geoimg>
```

FIG. 3

```
<geoimg src="http://server2/img2.jpg">
  <include geoimg="http://server3/img3.gim">
    <center x="480" y="270">
  </include>
</geoimg>
```

FIG. 11

```
<geoimg src="http://server1/img1.jpg">
  <include geoimg="http://server2/img2.gim">
    <center x="400" y="280">
  </include>
  <include geoimg="http://server4/img4.gim">
    <center x="230" y="280">
  </include>
</geoimg>
```

```
<geoimg src="http://server1/img1.jpg">
  <include geoimg="http://server2/img2.gim">
    <region> ~ 1401
      <point x="180" y="130">  ⎫
      <point x="640" y="130">  ⎬ 1402
      <point x="640" y="460">  ⎪
      <point x="180" y="460">  ⎭
    </region>
  </include>
</geoimg>
```

FIG. 17

```
<geoimg src="http://server1/img1.jpg">
  <include img="http://server2/img2.jpg">     ~1701
    <region>
      <point x="180" y="130">
      <point x="640" y="130">
      <point x="640" y="460">
      <point x="180" y="460">
    </region>
  </include>
</geoimg>
```

FIG. 18

```
<geoimg src="http://server2/img2.jpg">
</geoimg>
```

FIG. 19

```
<geoimg src="http://server1/img1.jpg">
  <include img="http://server2/img2.gim">
    <region>
      <point x="180" y="130">
      <point x="640" y="130">
      <point x="640" y="475">
      <point x="180" y="475">
    </region>
  <include img="http://server3/img3.gim">
    <region>
      <point x="400" y="240">
      <point x="660" y="240">
      <point x="660" y="435">
      <point x="400" y="435">
    </region>
  </include>
</geoimg>
```

FIG. 20

```
<geoimg src="http://server2/img2.jpg">
  <include img="http://server3/img3.gim">
   <region>
     <point x="320" y="200">
     <point x="680" y="200">
     <point x="680" y="470">
     <point x="320" y="470">
   </region>
  </include>
</geoimg>
```

APPARATUS AND METHOD FOR DISPLAYING IMAGE

FIELD OF THE INVENTION

This invention relates to an image display apparatus and method and a program for displaying a plurality of images, which are held at distributed locations, while making virtual walkthrough.

BACKGROUND OF THE INVENTION

Along with the popularization of the Internet and digital cameras, landscape images sensed by cameras are published on the Internet, and the landscape images around the country can be observed via the Internet. As a method of publishing such landscape images, a method of publishing an image as a part of a World Wide Web Page described using HTML is known. Also, a service that publishes image data in the form of an on-line album is known.

Keywords such as place names and the like and comments sprinkled with place names are often appended to such images, and an image search can be conducted using a keyword.

However, with the aforementioned related art, when the user observes a given landscape image, and wants to observe other landscape images near that place, he or she cannot easily acquire other images. This is because even when images near that place are published, they are not always searched using place names. Even if such images can be searched using place names, many inappropriate images are often extracted as search results by a search process conducted using place names, and it is difficult to find appropriate images from them. Also, the user can hardly recognize the positional relationship between the currently observed landscape image and other landscape images.

For example, when the user observes a landscape image of a given street, he or she often need to observe landscape images after he or she goes along that street. In this case, even when the user extracts the first landscape image based on a street name, he or she cannot always find a landscape image which is right down this street by a similar search process. Even if the user can find such image, he or she cannot easily recognize their positional relationship.

According to Japanese Patent Laid-Open No. 2002-140731, an image display apparatus which prepares a plurality of composite images of a virtual space, and selectively displays these images to allow a user to experience walkthrough of the virtual space is disclosed. Also, composite images are not actually taken images.

However, such apparatus which implements walkthrough display cannot display an arbitrary combination of a plurality of images held at distributed locations.

SUMMARY OF THE INVENTION

An image display apparatus, method, and program according to the present invention implement virtual walkthrough by shifting display to an image of another landscape that neighbors a currently displayed landscape upon displaying an image of that landscape in an environment in which a plurality of landscape images are held at distributed locations.

According to the present invention, since geographical relationship data that describes a geographical relationship between a plurality of image data is used, display can be made as if the user were moving from currently displayed image data to that at a moving destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of geographical relationship data in the embodiment of the present invention;

FIG. 3 shows another example of geographical relationship data in the embodiment of the present invention;

FIG. 11 shows still another example of geographical relationship data in the embodiment of the present invention;

FIG. 14 shows still another example of geographical relationship data in the embodiment of the present invention;

FIG. 17 shows still another example of geographical relationship data in the embodiment of the present invention;

FIG. 18 shows still another example of geographical relationship data in the embodiment of the present invention;

FIG. 19 shows still another example of geographical relationship data in the embodiment of the present invention;

FIG. 20 shows still another example of geographical relationship data in the embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
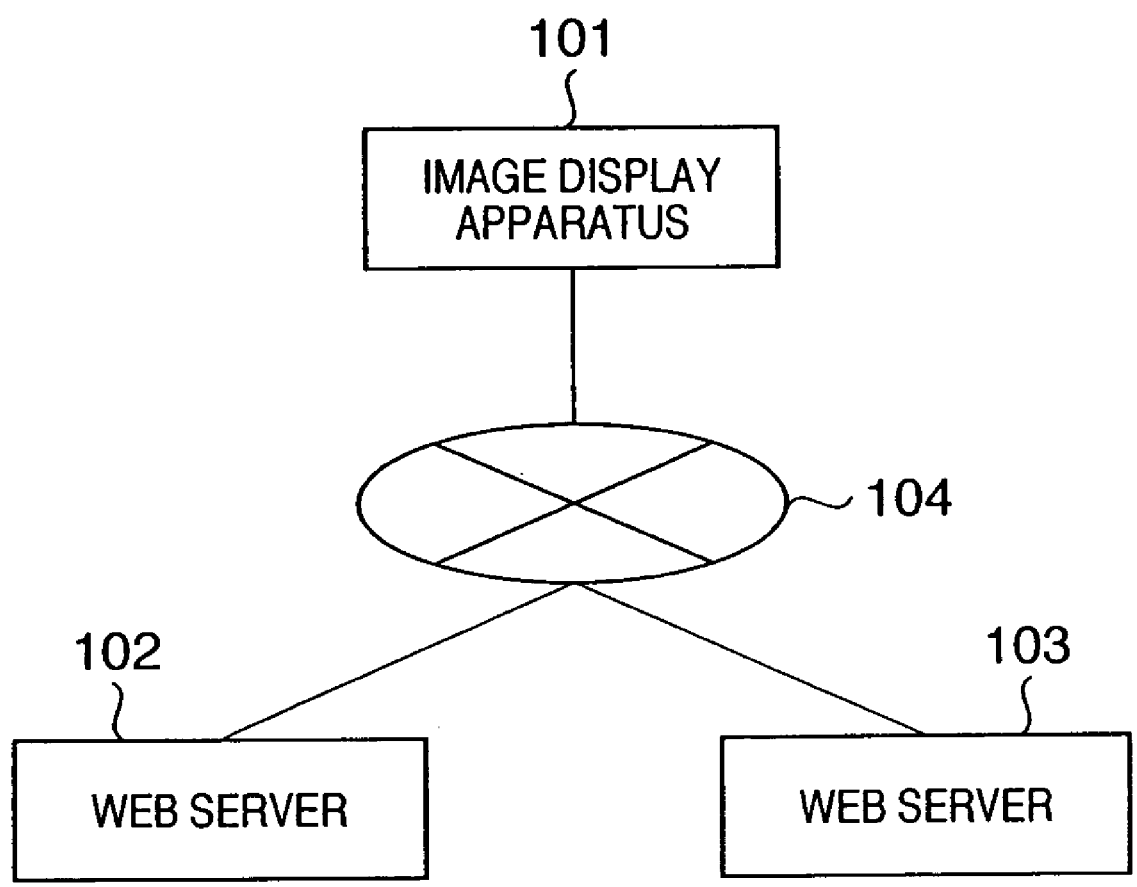
FIG. 1 shows an apparatus according to an embodiment of the present invention and a network.

FIG. 1 shows an overview of a network environment in which an image display apparatus of this embodiment is used. Reference numeral 101 denotes an image display apparatus of this embodiment. Reference numerals 102 and 103 denote Web servers, which hold image data of landscape images, and geographical relationship data that describes a geographical relationship between a plurality of image data. Reference numeral 104 denotes an Internet. The image display apparatus 101 accesses the Web servers 102 and 103 via the Internet 104, and acquires image data and geographical relationship data from the Web servers using HTTP. The image data and geographical relationship data are held by a plurality of distributed servers on the network.

FIG. 2 shows an example of geographical relationship data. More specifically, FIG. 2 shows geographical relationship data which is referred to by http://server1/img1.gim (identifier). Referring to FIG. 2, a "geoimg" tag 201 designates a base image. Note that the base image is a landscape image which is displayed on the image display apparatus 101 when corresponding geographical relationship data is designated at the image display apparatus 101 of this embodiment. The URL of the base image data is designated by an "src" attribute of the "geoimg" tag. More specifically, when http://server1/img1.gim is designated, corresponding geographical relationship data (FIG. 2) is extracted. Furthermore, http://server1/img1.jpg designated by "geoimg src" included in the extracted geographical relationship data is displayed.

The "geoimg" tag has an "include" tag indicating a destination image as one of elements. Note that the destination image indicates another landscape image obtained by sensing a landscape that neighbors that of the base image. When display is switched from the base image to the destination image, the user can experience virtual walkthrough as if he or she were moving in a real space.

The "include" tag is used when the entire landscape of the destination image is included in that of the base image. Reference numeral 202 denotes a use example of the "include" tag. The URL of another geographical relationship data can be designated by a "geoimg" attribute of the "include" tag. Another geographical relationship data is geographical relationship data which designates the destination image as a base image. In the example of FIG. 2, http://server2/img2.gim is designated as the URL of another geographical relationship data.

FIG. 3 shows an example of geographical relationship data which is referred t by http://server2/img2.gim. A base image of the geographical relationship data designated by the "include" tag serves as a destination image. Hence, the destination image is image data which is referred to by http://server2/img2.jpg.

The "include" tag can include data indicating the geographical positional relationship between the base image and destination image as elements. One of such elements is a "center" tag. Using the "center" tag, a point of the base image (move center point) corresponding to the center point of the destination image can be designated. Note that the "center" tag can be direction information since it serves to specify the direction of presence of the destination image with respect to the base image.

In FIG. 2, reference numeral 203 denotes a use example of the "center" tag. An x-attribute of the "center" tag assumes the X-coordinate value of the move center point, and a y-attribute assumes the Y-coordinate value of the move center point. This example uses a coordinate system which has the upper left corner of the base image as an origin, the right direction as a positive direction of an X-axis, the down direction as a positive direction of a Y-axis, and a pixel of an image as one unit.

Figure 4:
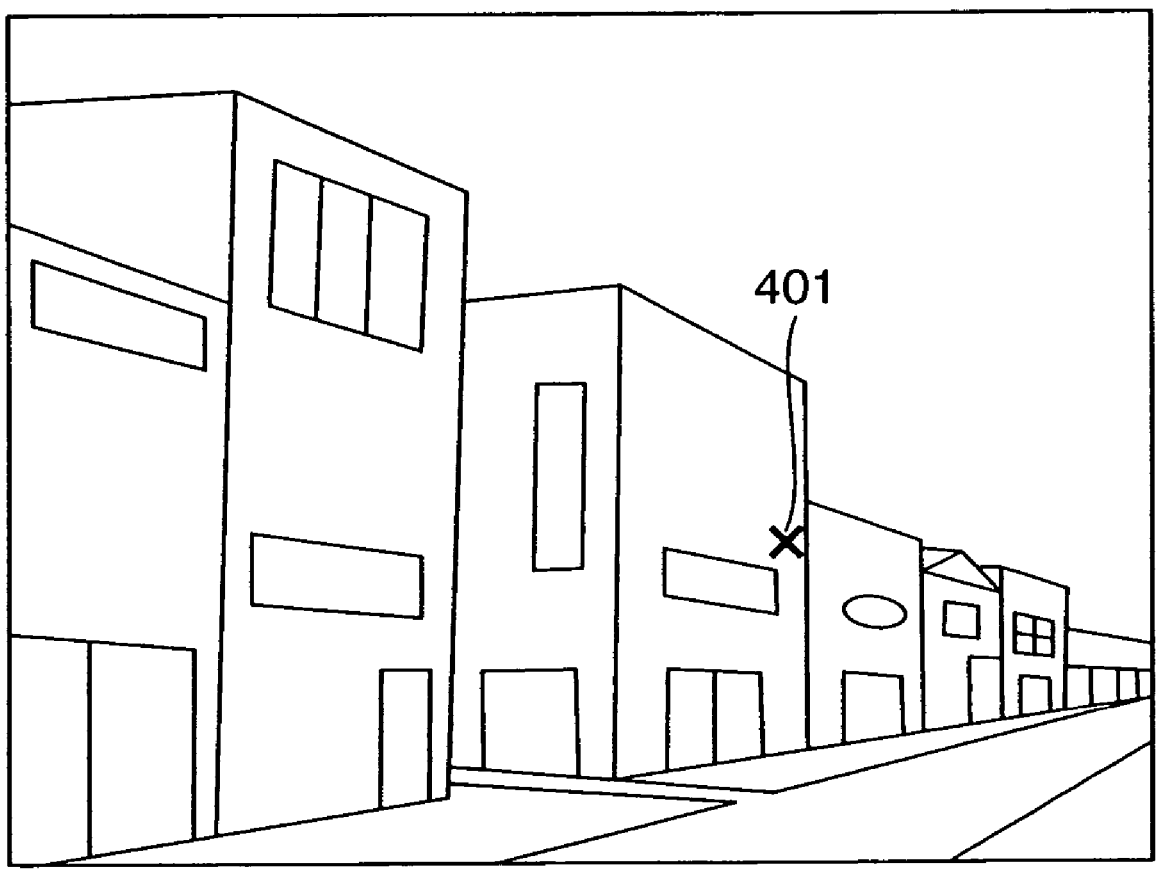
FIG. 4 shows an example of image data in the embodiment of the present invention.
Figure 5:
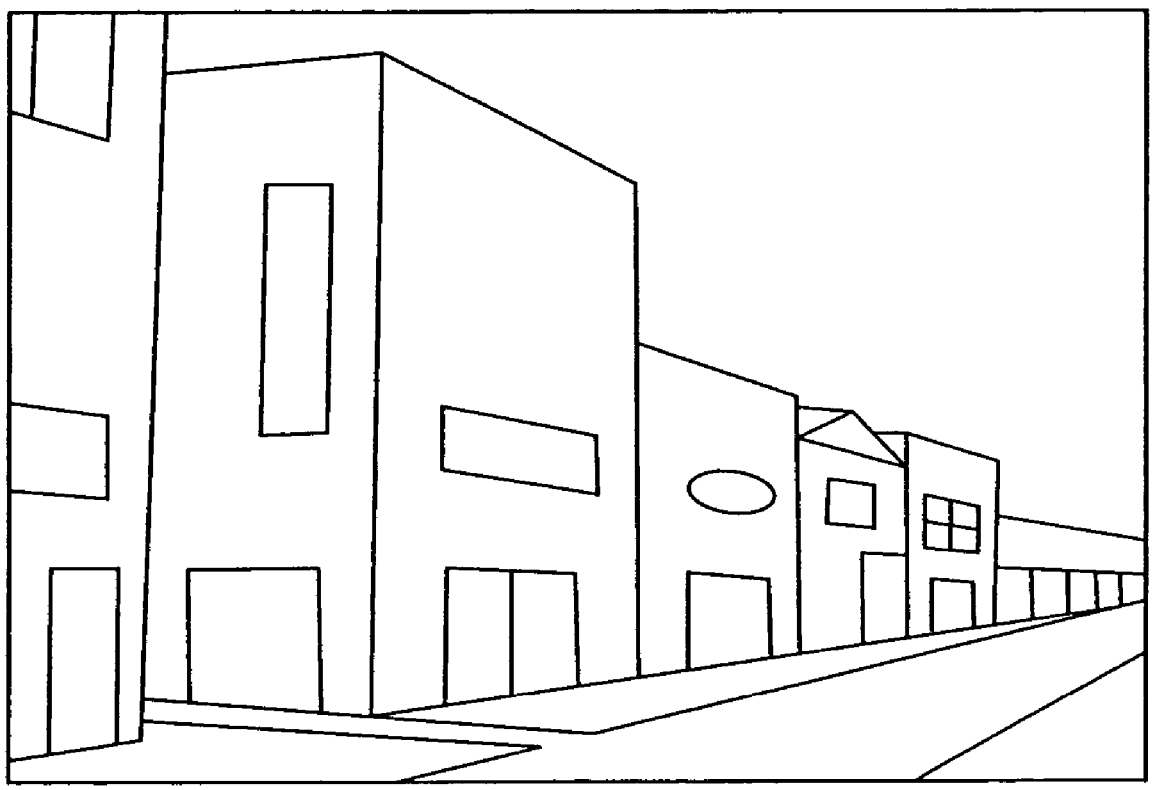
FIG. 5 shows another example of image data in the embodiment of the present invention.

FIGS. 4 and 5 show examples of the base image and destination image in the geographical relationship data in FIG. 2. FIG. 4 shows the base image (http://server1/img1.jpg) and FIG. 5 shows the destination image (http://server2/img2.jpg). A point 401 is a move center point with respect to the destination image shown in FIG. 5.

The base image and destination images may be held by a single Web server or may be distributed and held by a plurality of different Web servers. Even when a plurality of image data are held at distributed locations, it is easy to generate geographic relationship data.

Assume that geographic relationship data http://server2/img2.gim and image data http://server2/img2.jpg have been published. A person who wants to publish new image data http://server1/img1.jpg on server1 can generate geographical relationship data which is referred to by http://server1/img1.gim by designating a point corresponding to the center point of img2.jpg (FIG. 5) in the image of img1.jpg (FIG. 4).

In this manner, by publishing new data on server1, the positional relationship between the image data shown in FIGS. 4 and 5 can be described. This is similar to a process for publishing a new document that describes a link to an already published document on the World Wide Web. In this manner, since new geographical relationship data and image data can be published on another Web server without changing the already published geographical relationship data and image data, new geographical relationships can be easily established in turn.

An embodiment of an image display apparatus which displays image data using geographical relationship data established in this way will be explained below.

Figure 6:
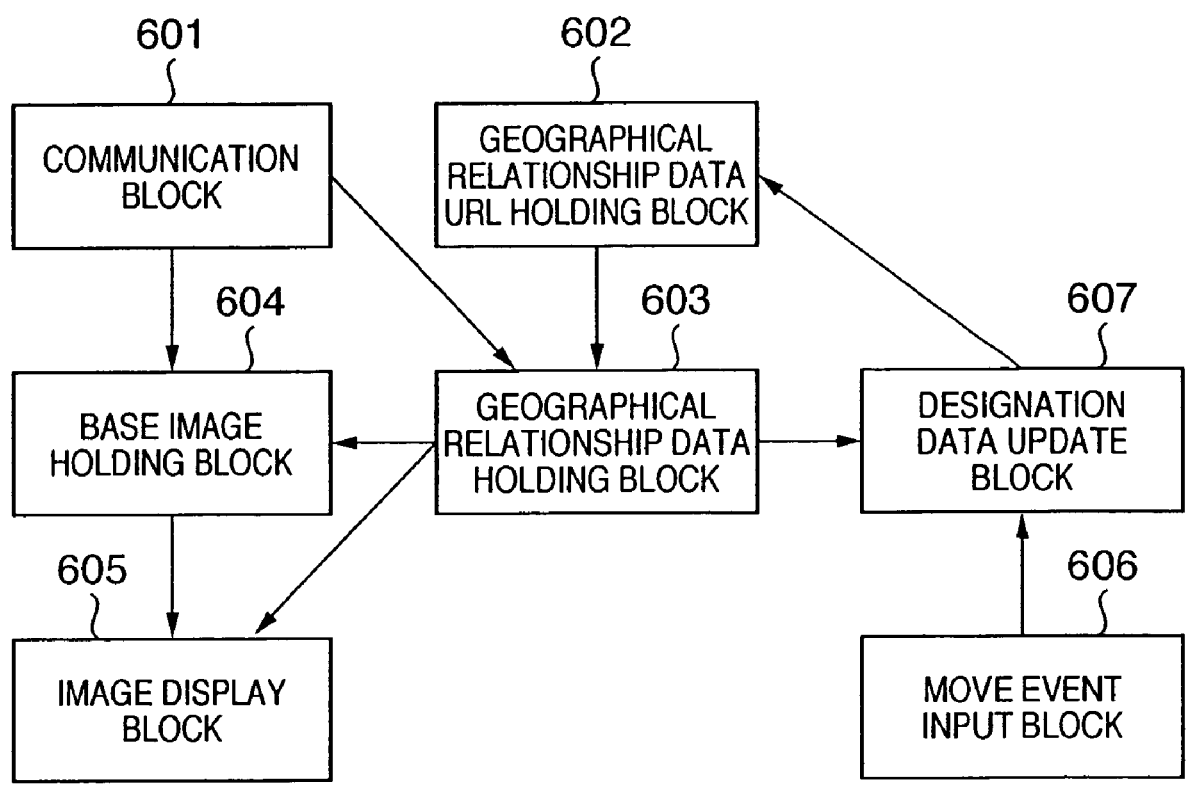
FIG. 6 shows functional blocks in the embodiment of the present invention.

FIG. 6 shows the functional blocks of the image display apparatus. Referring to FIG. 6, reference numeral 601 denotes a communication block which acquires data indicated by the designated URL from a Web server. Reference numeral 602 denotes a geographical relationship data URL holding block (to be referred to as a URL holding block) which holds the URL required to designate geographical relationship data. Reference numeral 603 denotes a geographical relationship data holding block which acquires and holds geographical relationship data designated by the URL held in the URL holding block 602 via the communication block 601. Reference numeral 604 denotes an image data holding block (to be referred to as a base image holding block hereinafter) which acquires and holds base image data designated by the geographical relationship data held in the geographical relationship data holding block 603 via the communication block 601. Reference numeral 605 denotes an image output (display) block which outputs an image processed using the geographical relationship data held in the geographical relationship data holding block 603 and image data held in the image data holding block 604. Reference numeral 606 denotes a move event input block which inputs a move event that designates movement to a destination image. Reference numeral 607 denotes a designation data update block which sets the URL of the next geographical relationship data in the URL holding block 602 on the basis of the geographical relationship data held in the geographical relationship data holding block 603.

These functional blocks may be implemented by either only hardware or software, or by a combination of hardware and software. When the aforementioned blocks are implemented by software, these blocks are implemented as software modules.

Figure 7:
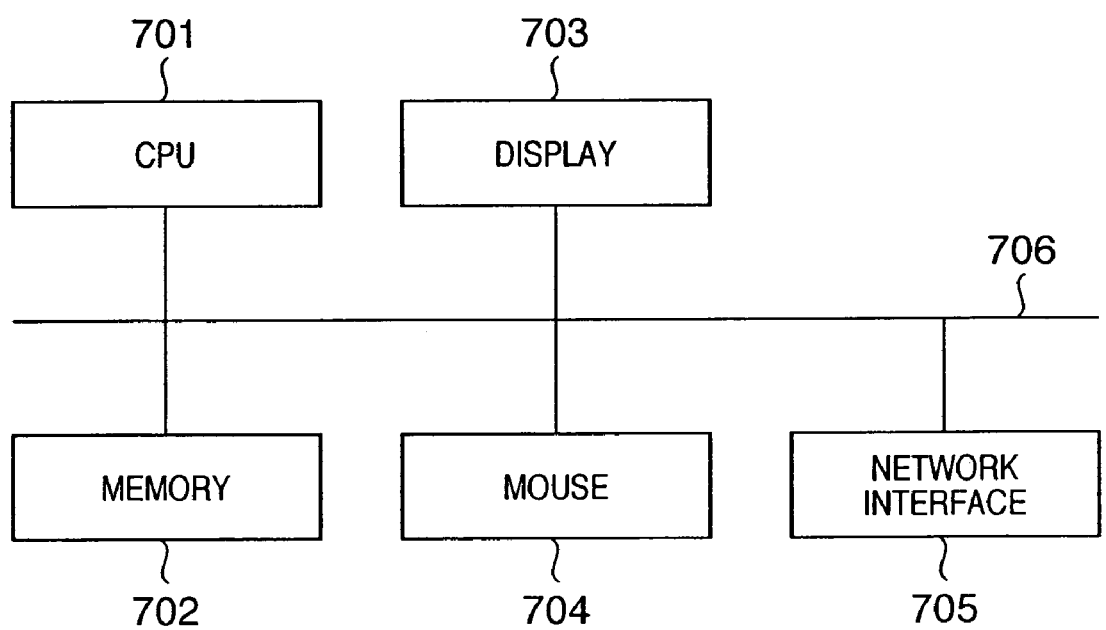
FIG. 7 shows the hardware arrangement in the embodiment of the present invention.

FIG. 7 shows the hardware arrangement of the image display apparatus according to this embodiment. Referring to FIG. 7, reference numeral 701 denotes a CPU which executes a computer program required to implement the aforementioned modules (functional blocks). Reference numeral 702 denotes a memory which stores the program required to implement the aforementioned modules and assures an area required to run the program and storage areas of the respective holding blocks. The memory is implemented using at least one of a ROM, RAM, hard disk drive, and the like. Reference numeral 703 denotes a display which implements image display by means of the image display block 605. Reference numeral 704 denotes an input device such as a mouse or the like, which implements the move event input block 606. A predetermined input operation such as clicking of a mouse button or the like is detected as a move event. Reference numeral 705 denotes a network interface which implements communications by the communication block 601. Reference numeral 706 denotes a bus which makes data transfer and transmission of control signals among the hardware modules.

Figure 8:
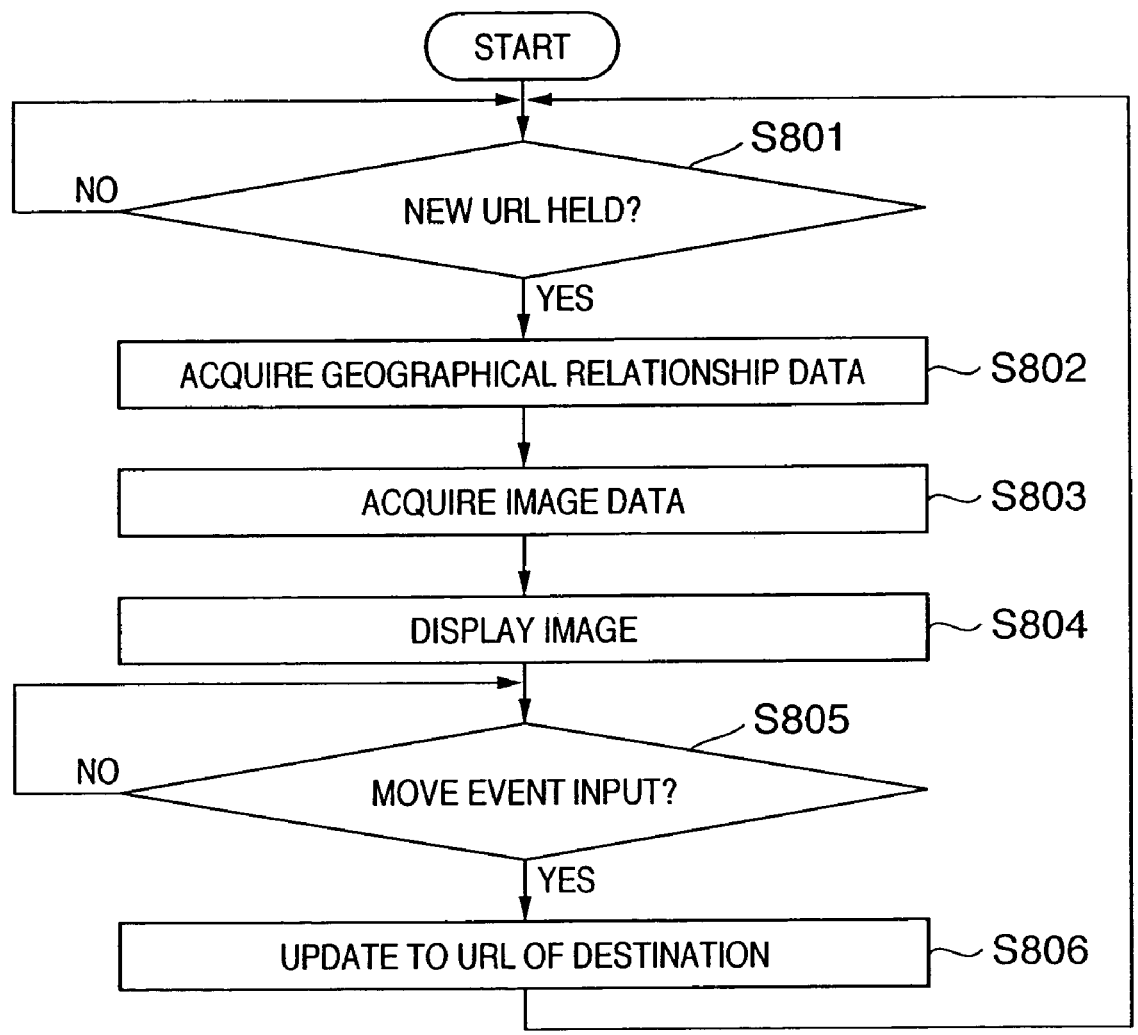
FIG. 8 shows the processing sequence in the embodiment of the present invention.

FIG. 8 is a flowchart showing an example of the process of the image display apparatus. The CPU 701 checks in step 801 if a new URL (identifier) is held by the URL holding block 602. If the new URL is held, the flow advances to step 802; otherwise, step 801 is repeated.

In step 802, the CPU 701 acquires geographical relationship data designated by the URL held in the URL holding block 602 from the Web server using the function of the communication block 601. The CPU 701 holds the acquired geographical relationship data in the geographical relationship data holding block 603 so as to parse the acquired geographical relationship data to acquire respective elements. Since these processes are the same as those normally done by a Web browser, a detailed description thereof will be omitted. The flow then advances to step 803.

In step 803, the CPU 701 acquires (extracts) the URL of corresponding base image data from the parsing result in step 802, acquires image data designated by this URL from the Web server, and holds this image data in the base image data holding block 604. The flow then advances to step 804.

In step 804, the CPU 701 converts image data held in the base image data holding unit 604 to match the size of the display region of the image display block 605 and displays that image data. Note that the CPU 701 may calculate a line segment that connects a middle point which equally divides the lower side of image data, and a move center point held in the geographical relationship data holding block 603, and may superimpose an arrow figure which is directed from the middle point of the image data to the middle point of this line segment on the image data. The arrow figure is pointer information which allows the user to visually recognize the direction of presence of the next destination candidate. The flow advances to step 805.

Figure 9:
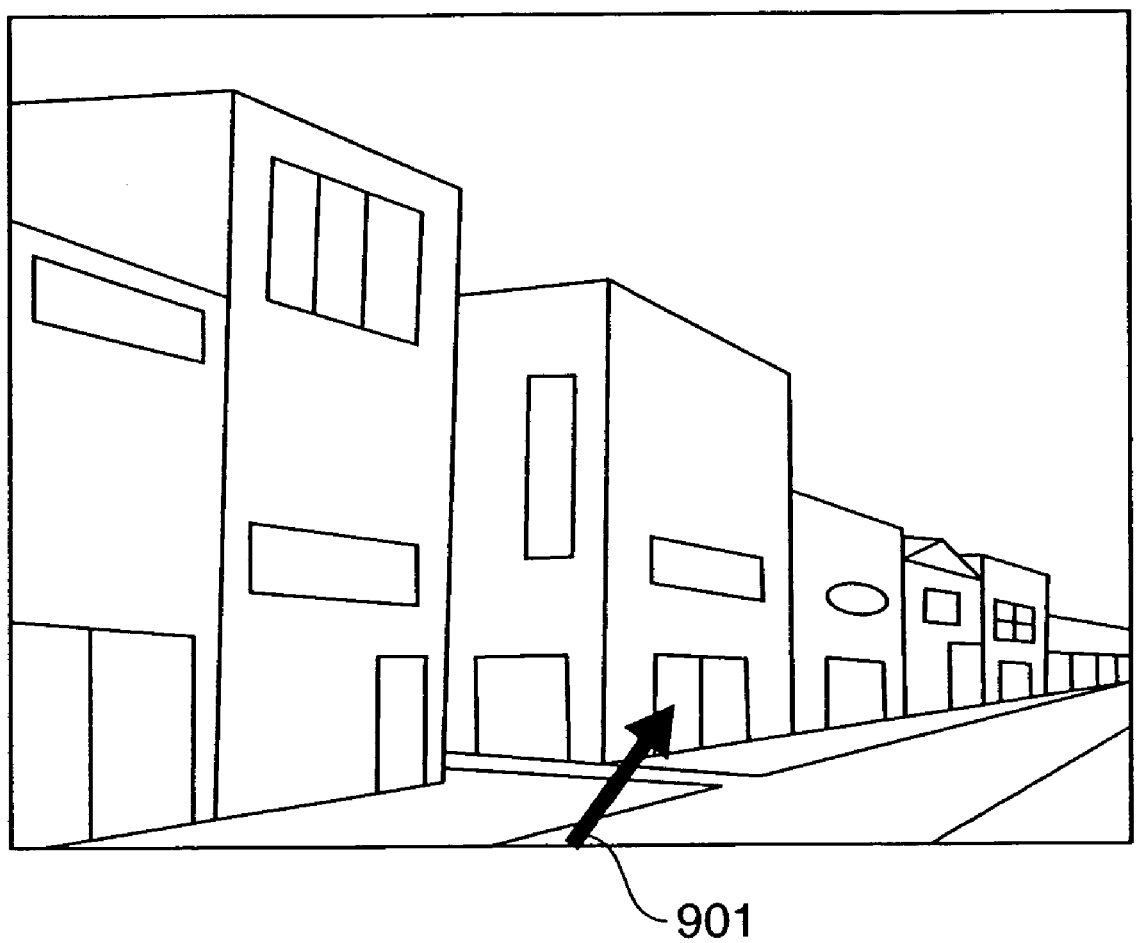
FIG. 9 shows an image display example in the embodiment of the present invention.

FIG. 9 shows a display example of an image based on the geographical relationship data shown in FIG. 2, and base image data shown in FIG. 4. An arrow 901 in FIG. 9 indicates an approximate moving direction upon moving from the base image to the destination image.

The CPU 701 checks in step 805 if an event is input to the move event input block 606. For example, upon detection of clicking of the mouse 704, it is determined that an event is input. If an event is input, the flow advances to step 806; otherwise, step 805 is repeated.

In step 806, the CPU 701 extracts the URL of geographical relationship data of the destination image held in the geographical relationship data holding block 603, and holds the extracted URL in the URL holding block 602. The flow returns to step 801. In the above example, http://server3/img3.gim is newly held.

Figure 10:
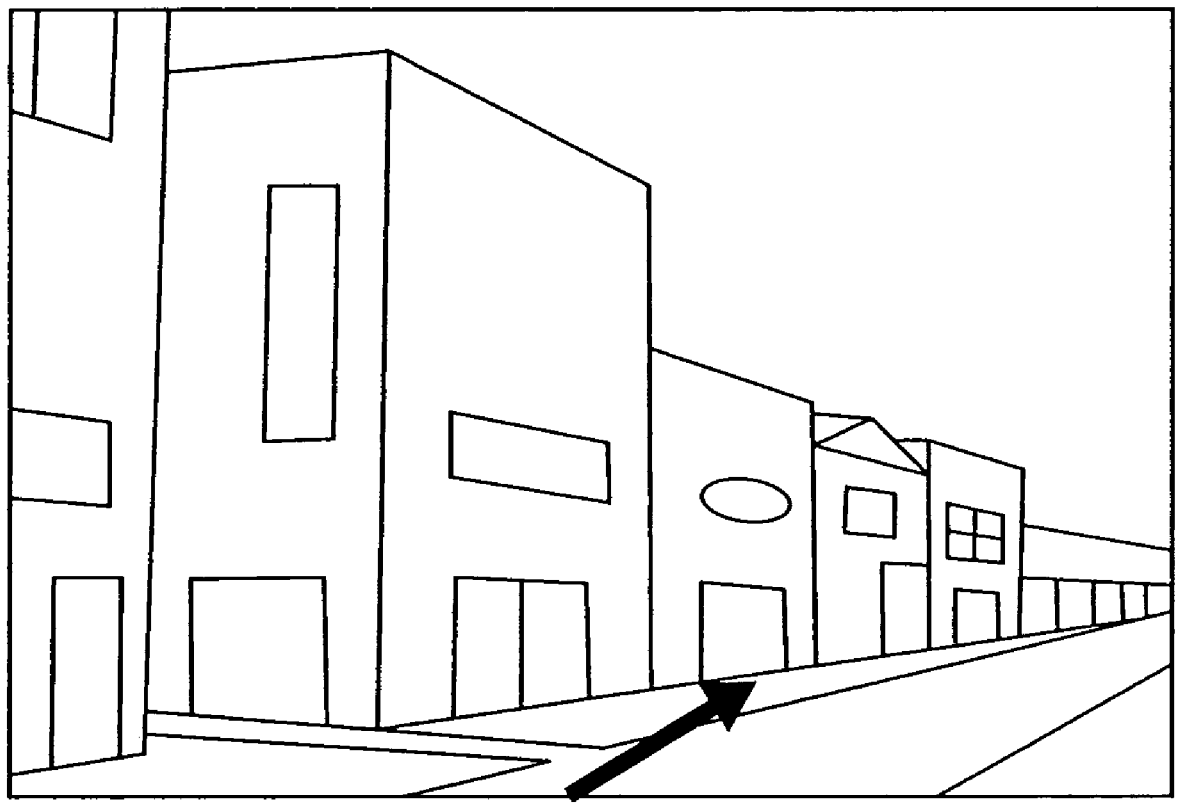
FIG. 10 shows another image display example in the embodiment of the present invention.

After the flow returns to step 801, the same process as in the above description is executed, and an image is displayed on the basis of the geographical relationship data shown in FIG. 3 and base image data shown in FIG. 5. FIG. 10 shows this display example.

With the above process, the image display apparatus of this embodiment acquires geographical relationship data and image data which are independently held at distributed locations from respective Web servers, and selectively displays the plurality of acquired image data, thus implementing virtual walkthrough.

Second Embodiment

In the description of the above embodiment, the base image is immediately switched to the destination image. Before switching to the destination image, the base image may be switched to the destination image after it is zoomed up toward the move center point. That is, the CPU 701 extracts a new rectangular image whose vertices are located on line segments that connect the vertices of the base image to the move center point from the base image, and displays the extracted rectangular image on the image display block 605, thus obtaining a zoom-in effect. After that, the destination image is displayed.

Alternatively, a morphing technique may be applied to the base image and destination image. According to the morphing technique, a plurality of intermediate images are generated from the base image and destination image, and are displayed in turn. Since the morphing technique is known to those who are skilled in the art, a detailed description thereof will not be required.

According to this embodiment, smoother movement display can be implemented compared to the base image is immediately switched to the destination image.

Third Embodiment

In the description of the above embodiment, geographical relationship data that defines only one destination image with respect to a base image is used. However, according to the present invention, a plurality of destination images may be defined.

Figure 12:
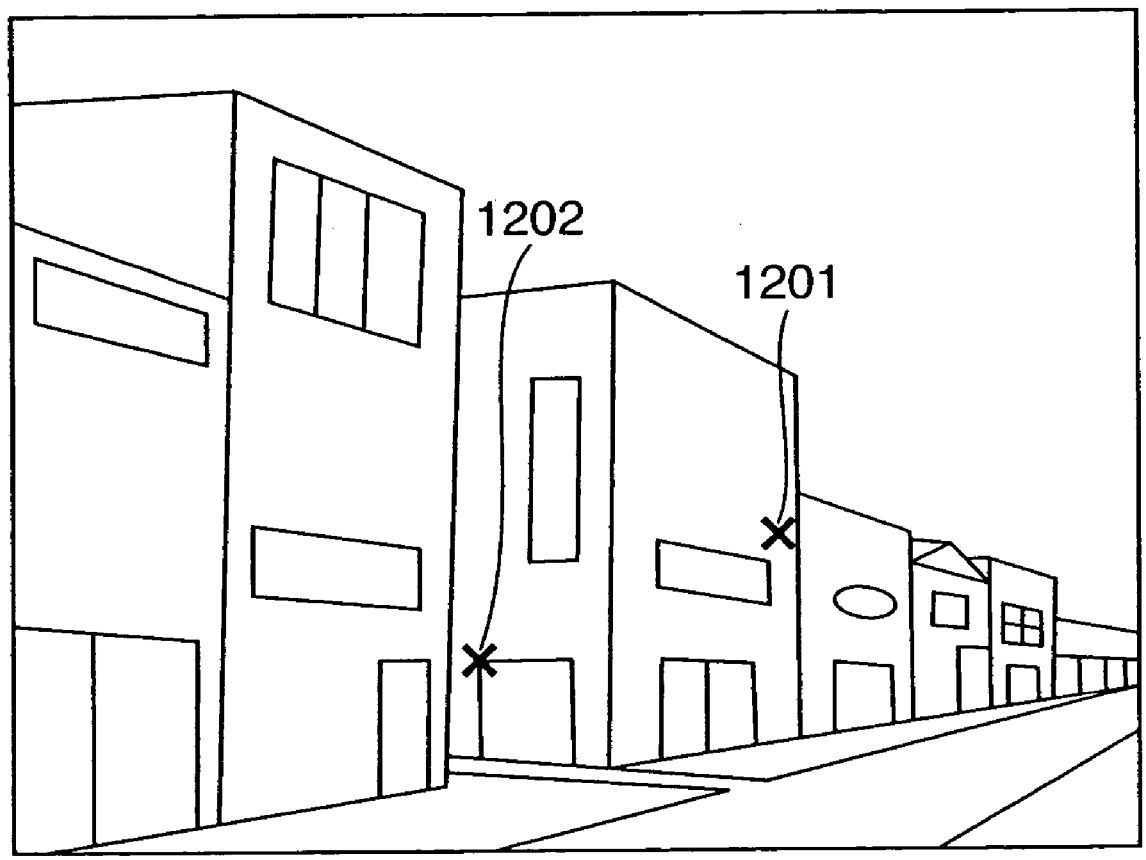
FIG. 12 shows an example of a move center point in the embodiment of the present invention.

FIG. 11 shows an example of geographical relationship data that defines two destination images. FIG. 12 shows two move center points with respect to the geographical relationship data shown in FIG. 11. In FIG. 12, reference numerals 1201 and 1202 denote two move center points.

Figure 13:
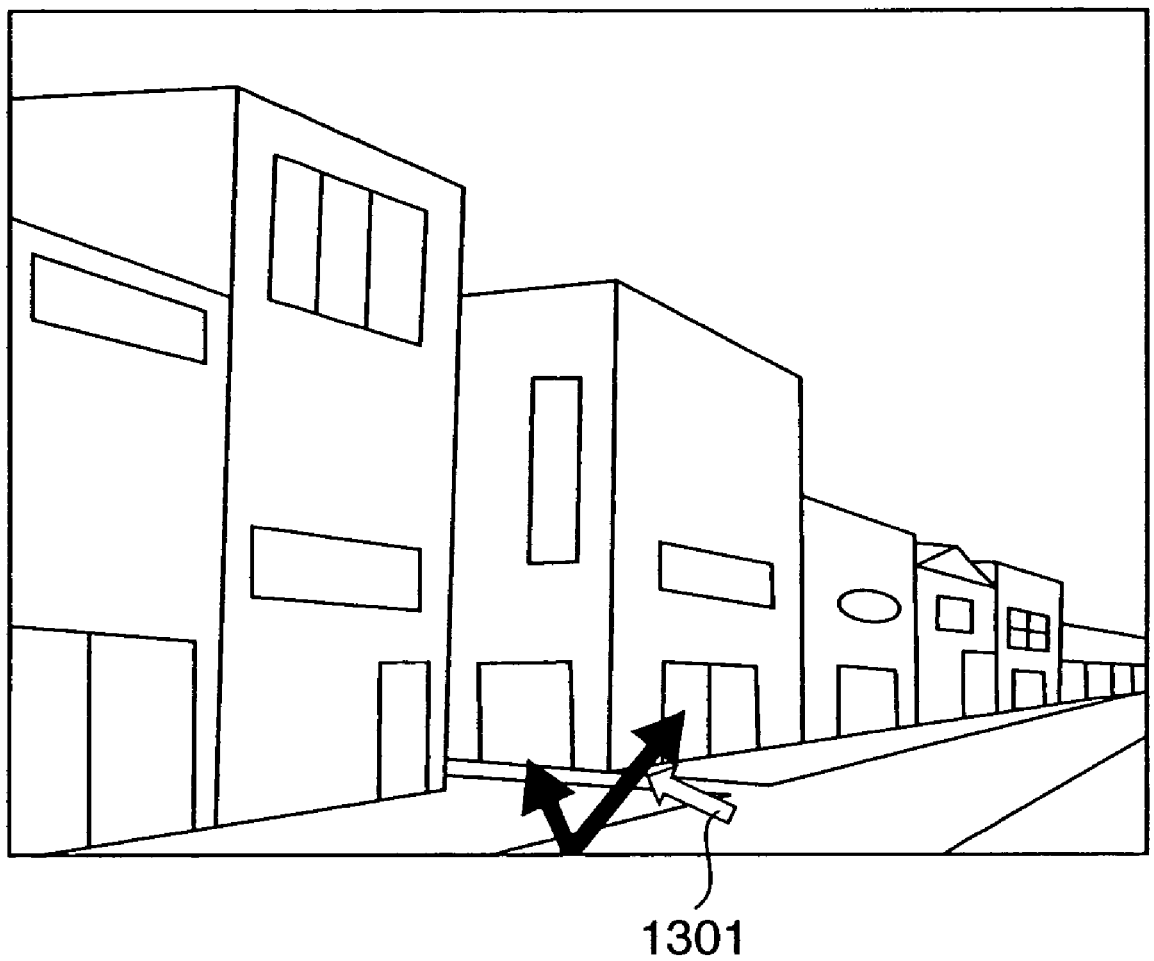
FIG. 13 shows an image display example in another embodiment of the present invention.

If there are a plurality of move center points, an image display process displays arrows corresponding to these move center points. Also, in a move event input, a function of selecting one of a plurality of destinations is provided. For example, when a cursor (1301) is displayed, as shown in FIG. 13, and the CPU 701 detects that the mouse button is clicked while the cursor overlaps the arrow, a destination corresponding to the clicked arrow is selected to advance the process.

More specifically, the CPU 701 assigns identification codes to respective arrows, and holds the correspondence between the identification codes and the URLs of the corresponding geographical relationship data in the memory 702 in the form of a table. By comparing coordinate data of the clicked position with that of each arrow, the CPU 701 can determine the selected one of the arrows.

Fourth Embodiment

In the description of the above embodiments, the geographical relationship with each destination image is described using a move center point. However, the present invention is not limited to this, and arbitrary other relationship description methods can be used. For example, the geographical relationship can be described using points on the base image corresponding to the vertices of the destination image. In this case, the points on the base image represent a rectangular region (to be referred to as a move region hereinafter).

FIG. 14 shows an example of geographical relationship data described using a move region. A "region" tag 1401 indicates a move region of the destination image. The "region" tag can also be used as direction information since it serves to specify the direction of presence of the destination image with respect to the base image. The "region" tag includes four "point" tags 1402 as elements. Each "point" tag indicates the coordinate position of each vertex of the move region. An x-attribute of the "point" tag indicates the X-coordinate of the vertex to be described, and a y-attribute indicates the Y-coordinate of the vertex to be described.

Figure 15:
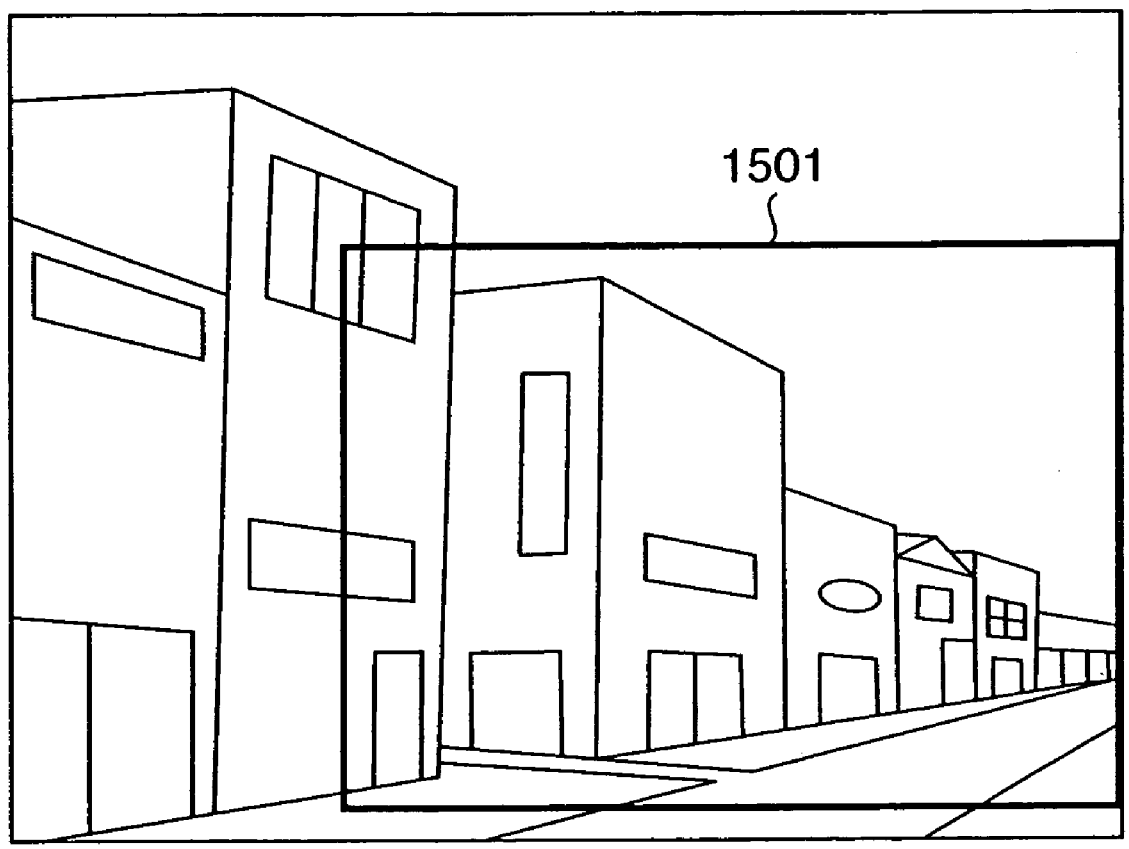
FIG. 15 shows an example of a moving region in the embodiment of the present invention.

FIG. 15 shows a move region defined by the geographical relationship data shown in FIG. 14. A region indicated by a rectangle 1501 serves as a move region. If some of the coordinates of the four points which represent the move region fall outside the base region, those of the side of the base image may be used. In this case, the right side of the move region 1501 is displayed to overlap that of the base image, as shown in FIG. 15.

Figure 16:
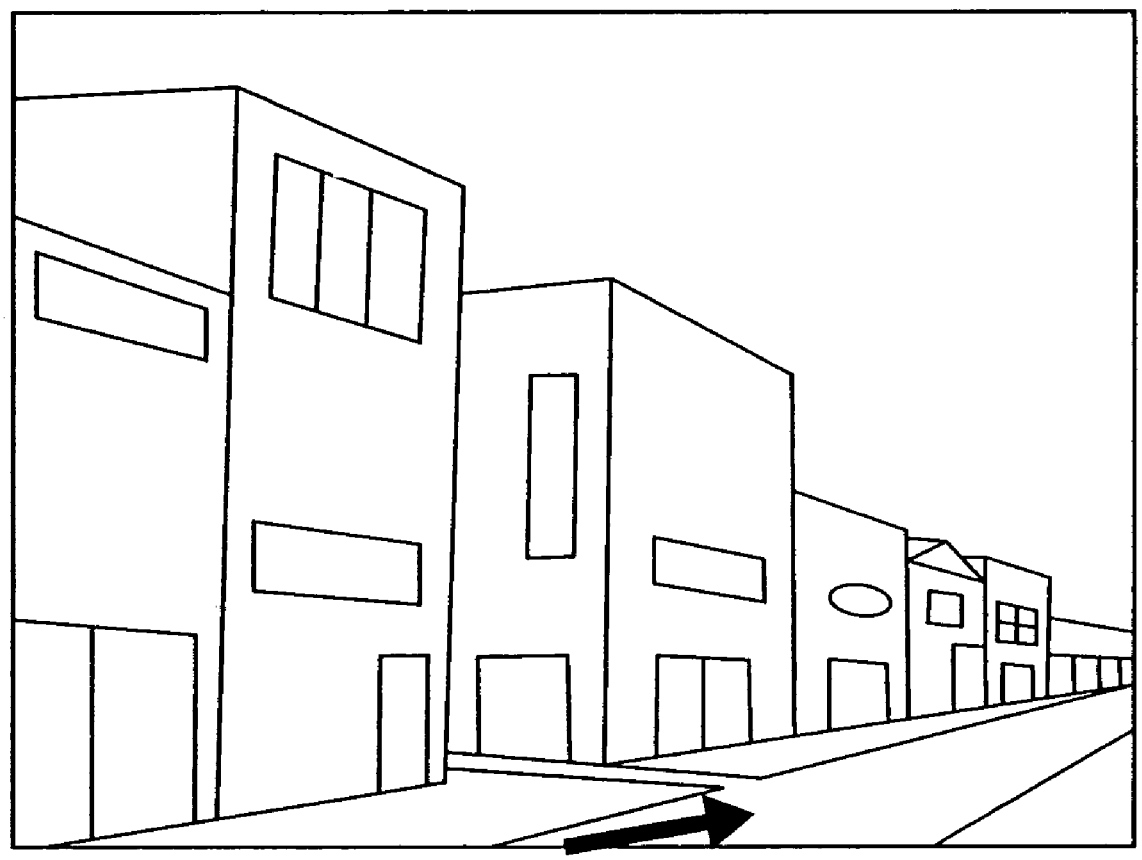
FIG. 16 shows an image display example in still another embodiment of the present invention.

When the destination is displayed using the aforementioned move region, the method of displaying an arrow indicating the move direction may be changed as needed. In this case, an arrow is preferably displayed from the middle point of the lower side of the base image toward that of the lower side of the move region. Compared to the prior arts, the move direction can be displayed more adequately. FIG. 16 shows such display example.

Fifth Embodiment

In the description of the above embodiments, an arrow in the move direction is displayed to indicate the destination. However, the present invention is not limited to this, and other display methods may be used. For example, when the destination image is defined by the move region, line segments 1501 that bound the move region may be superimposed on the base image.

Sixth Embodiment

In the description of the above embodiments, given geographical relationship data designates another geographical relationship data as a destination. However, the present invention is not limited to this. For example, a destination image may be directly designated. FIG. 17 shows an example of geographical relationship data that directly designates a destination image. Reference numeral 1701 denotes an example in which the URL of a destination image is designated by an "img" attribute of an "include" tag. More specifically, since the "img" attribute is used in place of the "src" attribute, the CPU 701 can recognize whether geographical relationship data is designated or image data is directly designated.

Upon detection of a move event while a destination image is directly designated, the CPU 701 acquires and displays the destination image from the server. Since the new base image which is displayed in this way includes no geographical relationship data, no more movement is allowed.

Seventh Embodiment

In the above embodiments, when movement is made by directly designating the destination image, no more movement is allowed in principle.

Figure 18:
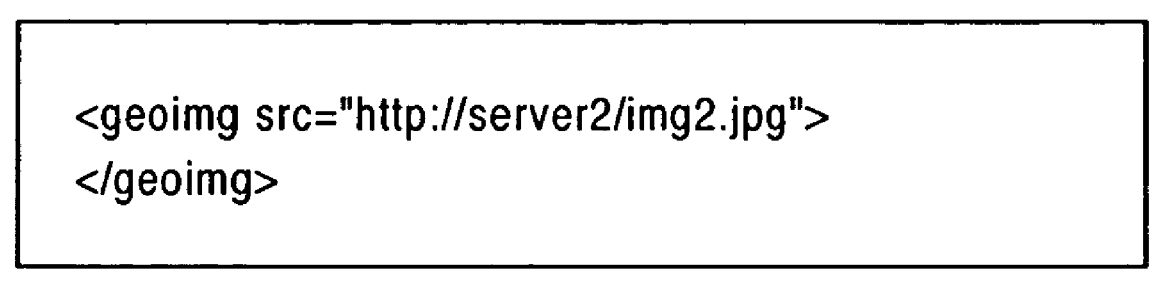

FIG. 18 shows an example of geographical relationship data according to this embodiment. In this example, the geographical relationship data includes only the URL of the image data but does not include any information associated with image data of the next destination. Hence, no more movement is allowed.

However, the present invention is not limited to this. For example, the CPU 701 may generate geographical relationship data for the current base image on the basis of the geographical relationship data used in the previous movements, so as to allow another movement.

FIG. 19 shows an example of geographical relationship data according to this embodiment. As shown in FIG. 19, when a plurality of destination images (http://server2/img2.gim and http://server3/img3.gim) including the current base image are defined in geographical relationship data of a base image (to be referred to as an old base image (http://server1/img1.jpg) hereinafter) before movement to the current base image (http://server2/img2.jpg), the CPU 701 establishes the geographical relationship between the current base image and other destination images as follows.

Let P0, P1, P2, and P3 be respective vertices of the current base image. Let P'0, P'1, P'2, and P'3 be respective vertices of a move region of the current base image in the old base image. Between these vertices, matrix A that attains the following linear transformation is present.

$$P0 = A \cdot P'0$$

$$P1 = A \cdot P'1$$

$$P2 = A \cdot P'2$$

$$P3 = A \cdot P'3$$

Matrix A can be calculated from these relationships. Next, another destination image in the old base image will be examined. Let Q'0, Q'1, Q'2, and Q'3 be respective vertices of this move image. Let Q0, Q1, Q2, and Q3 be respective vertices of a move region when this image is used as a destination image of the current image. Then, we have:

$$Q0 = A \cdot Q'0$$

$$Q1 = A \cdot Q'1$$

$$Q2 = A \cdot Q'2$$

$$Q3 = A \cdot Q'3$$

Using these equations, a move region for the current base image can be calculated. A destination image can be set for the current base image using the move region calculated in this way, and a move process can be made.

FIG. 20 shows an example of newly generated geographical relationship data. This example shows geographical relationship data (img2.gim) which is generated based on geographical relationship data (img1.gim in FIG. 19) of the old base image and is used to make movement from the current base image to the destination image.

Figure 21:
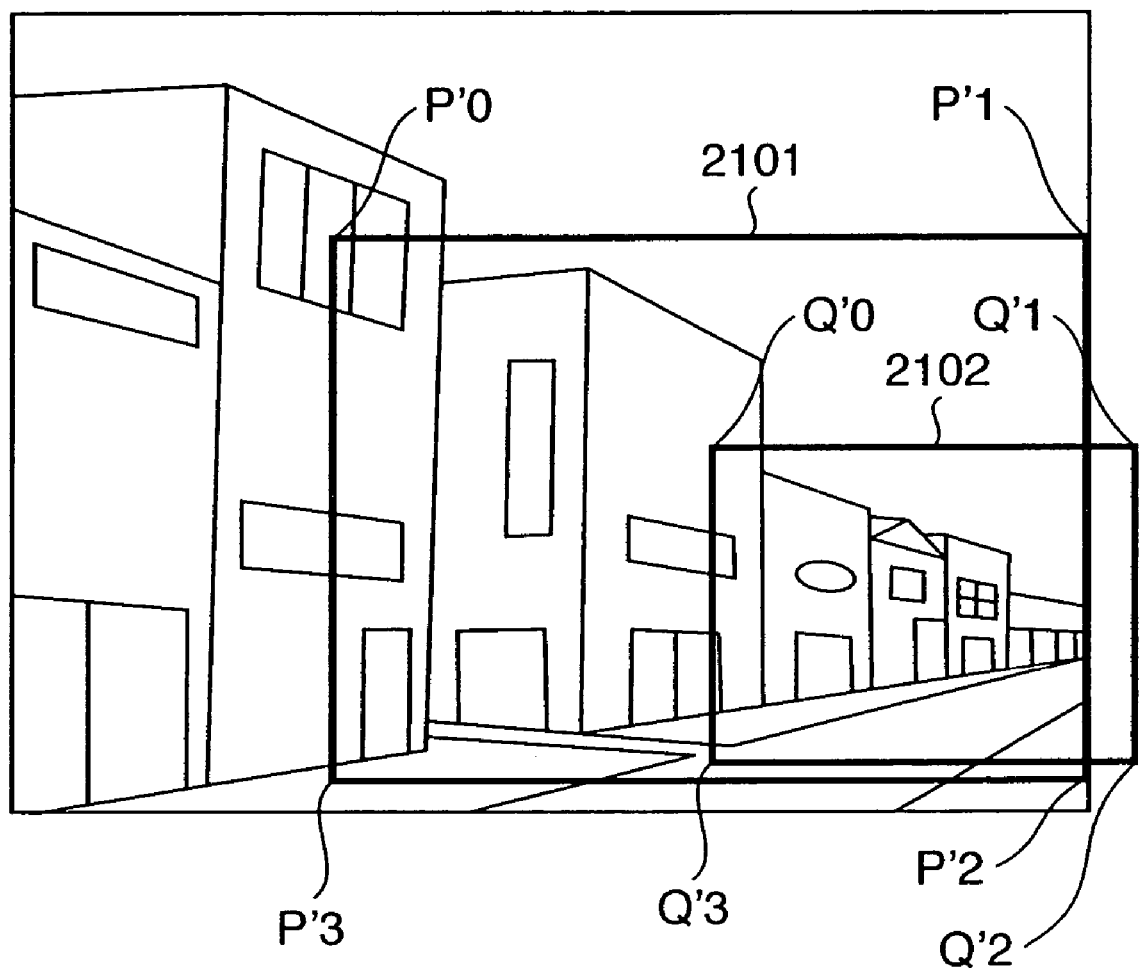
FIG. 21 shows an example of a moving region in still another embodiment of the present invention.

FIG. 21 shows an example of a base image having two destination images defined by two move regions 2101 and 2102. Assume that direct movement is made to the destination image (img2.jpg) defined by the move region 2101. In this embodiment, the CPU 701 calculates a transformation matrix on the basis of respective points shown in FIG. 21 and respective vertices of new base image data.

Figure 22:
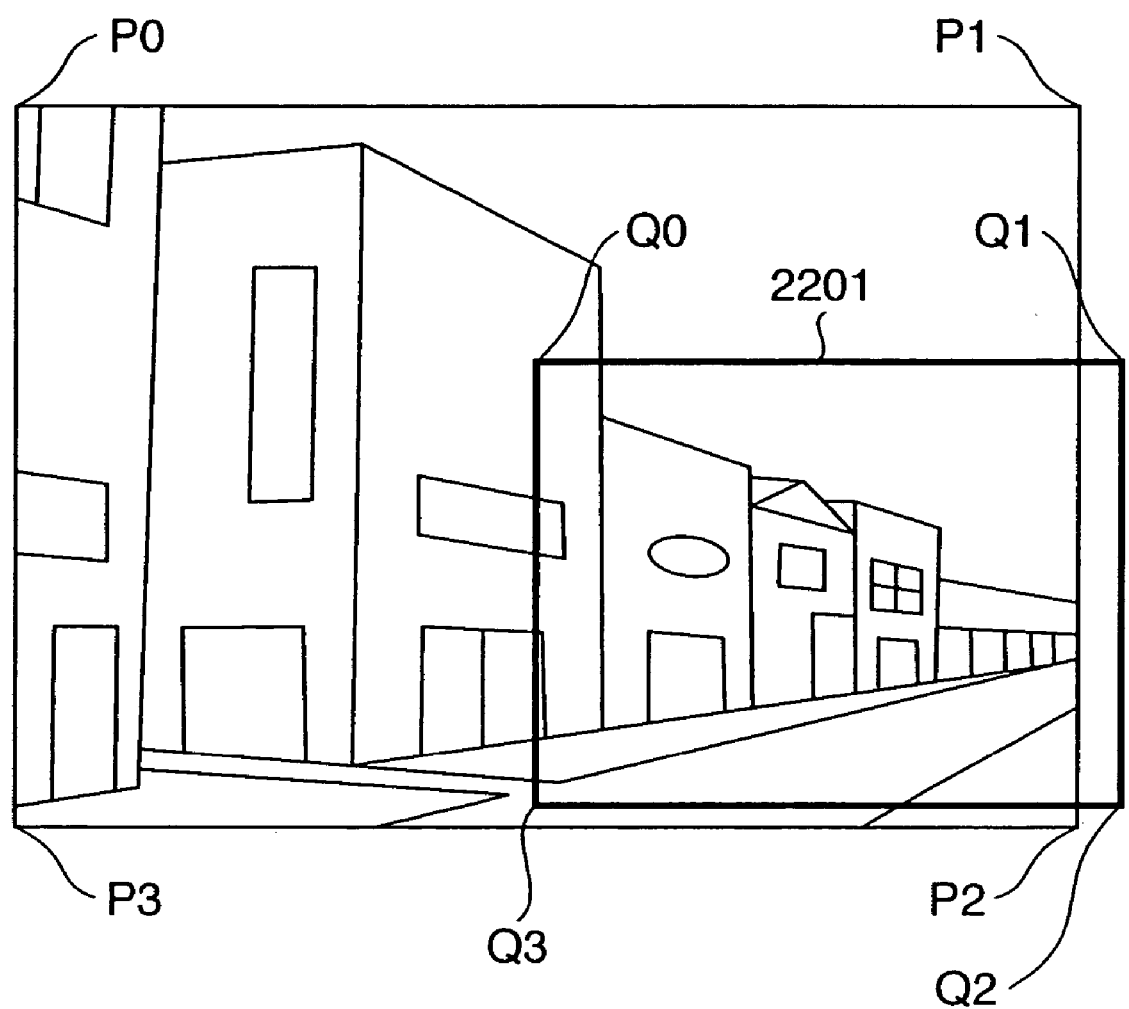
FIG. 22 shows an example of a formed image region in still another embodiment of the present invention.
Figure 23:
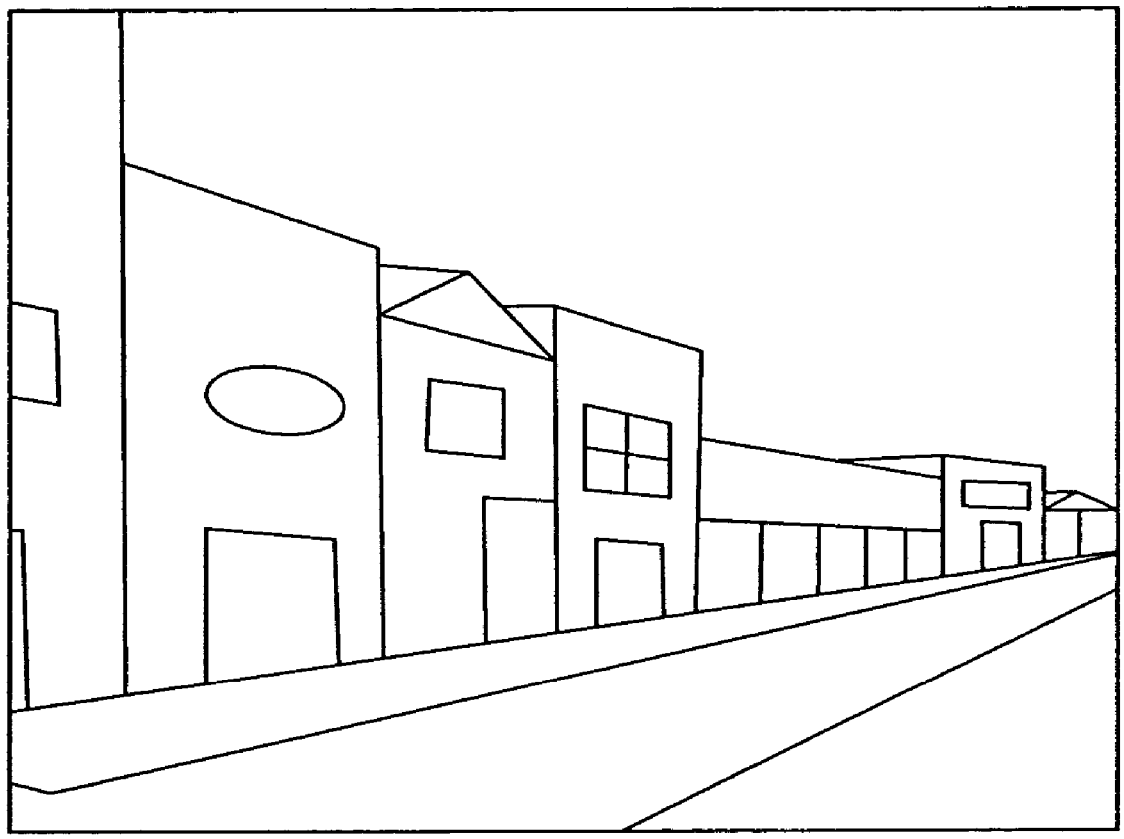
FIG. 23 shows an image display example in still another embodiment of the present invention.

The CPU 701 then calculates a move region 2201 of the destination image (img3.jpg) in the current base image data (img2.jpg) using the transformation matrix, and generates the aforementioned new geographical relationship data (img2.gim in FIG. 20). FIG. 22 shows the move region 2201 calculated in this way. Upon detection of a move event to the calculated move region 2201, the CPU 701 reads out the URL (http://server3/img3.gim) of geographical relationship data of the destination image data (img3.jpg) from the geographical relationship data (FIG. 20), extracts http://server3/img3.jpg included in the readout geographical relationship data (img3.gim), acquires image data from the corresponding server, and displays it on the display device.

With the above process, the move process can be done between image data, for which no geographical relationship data is not directly defined, using geographical relationship data defined for another image, thus displaying a destination image.

Eighth Embodiment

In the description of the above embodiments, pointer information such as the arrow indicating the move direction, the region indicating the destination, and the like is always displayed. However, the present invention is not limited to this. For example, only when the CPU 701 detects right clicking of the mouse 704, pointer information may be displayed. Conversely, only when the CPU 701 detects right clicking, pointer information may be cleared. In this manner, by switching the display/non-display state of pointer information, the landscape image can be prevented from being partially concealed by the pointer information.

Another Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the above embodiments, images are displayed using geographical relationship data that describes the geographical relationship between a plurality of image data as if movement were made from the currently displayed image data to destination image data. In this way, even in an environment in which a plurality of landscape images are held at distributed locations, virtual walkthrough can be implemented by displaying an image of a given landscape and making transition to another landscape image obtained by sensing a landscape that neighbors the currently displayed landscape.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-346142 filed on Oct. 3, 2003, which is hereby incorporated by reference herein.

What is claimed is:

1. An apparatus for implementing walkthrough display by displaying a plurality of image data held on a network in turn, comprising:
   a processor for executing a computer-executable program; and
   a memory medium on which is stored a computer-executable program for implementing a method for implementing the walkthrough display, the method comprising the steps of:

acquiring image data of a first landscape from a first server on the network on the basis of geographical relationship data which includes a network identifier required to identify the image data of the first landscape and direction information associated with the direction of a presence of a second landscape with respect to the first landscape;

displaying the image data of the first landscape together with pointer information that suggests a geographical relationship of the first landscape to the second landscape based on the geographical relationship data;

detecting an input to the pointer information;

updating the geographical relationship data when the input to the pointer information is detected;

controlling to acquire image data of the second landscape from a second server on the network different from the first server from which the image data of the first landscape was acquired, and to display the image data of the second landscape in substitution for the image data of the first landscape;

calculating, when the geographical relationship data associated with the second landscape does not include any network identifier of geographical relationship data associated with another landscape, and the geographical relationship data associated with the first landscape includes direction information associated with the second landscape and direction information associated with a third landscape which has a geographical relationship with the first landscape, direction information to image data of the third landscape with respect to the image data of the second landscape on the basis of the direction information associated with the second landscape and the direction information associated with the third landscape; and generating geographical relationship data associated with the third landscape, which includes the calculated direction information and network identification information required to identify the image data of the third landscape.

2. The apparatus according to claim 1, wherein the geographical relationship data associated with the first landscape includes a network identifier of geographical relationship data associated with the second landscape, or a network identifier required to identify image data of the second landscape.

3. The apparatus according to claim 1, wherein the geographical relationship data associated with the first landscape further includes a network identifier of geographical relationship data associated with the third landscape which has a geographical relationship with the first landscape, and direction information associated with a moving direction and moving distance from the first landscape to the third landscape with respect to the first landscape, and said step of displaying further displays pointer information associated with the third landscape in addition to the pointer information associated with the second landscape.

4. The apparatus according to claim 1, wherein the direction information includes coordinate data of a specific point in the image data of the first landscape, which corresponds to a specific point in the image data of the second landscape.

5. The apparatus according to claim 4, wherein the specific point in the image data of the second landscape includes a center point of the image data of the second landscape or four vertices of the image data of the second landscape.

6. The apparatus according to claim 1, wherein the pointer information is an arrow image or a line which bounds the second landscape.

7. The apparatus according to claim 1, further comprising the step of switching a display/non-display state of the pointer information.

8. The apparatus according to claim 1, wherein said displaying step further comprising the step of displaying a plurality of pointer information with the image data of the first landscape.

9. The apparatus according to claim 1, wherein the image data of the second landscape is newly opened on the network.

10. The apparatus according to claim 4, further comprising a step of associating the image data of the second landscape with the image data of the first landscape to create geographical relationship data between the first landscape and the second landscape, and the associating step comprises the steps of:

displaying the image data of the first landscape;

accepting an input which suggests a position in the image data of the first landscape, the suggested position corresponding to a center position of the image data of the second landscape; and writing the coordinate data of the suggested position into the geographical relationship data of the first landscape.

11. The apparatus according to claim 1, wherein the geographical relationship data is described in a markup language which can be interpreted by a web browser, and the geographical relationship data of the first landscape includes:

a first tag for specifying the image data of the first landscape;

a second tag for specifying the image data of the second landscape or the geographical relationship data of the second landscape; and a third tag for specifying coordinate information of a suggested position.

12. A method for implementing walkthrough display by displaying a plurality of image data held on a network in turn, comprising:

acquiring image data of a first landscape from a first server on the network on the basis of geographical relationship data which includes a network identifier required to identify the image data of the first landscape and direction information associated with the direction of a presence of a second landscape with respect to the first landscape;

displaying the image data of the first landscape together with pointer information that suggests a geographical relationship of the first landscape to the second landscape based on the geographical relationship data;

detecting an input to the pointer information;

updating the geographical relationship data when the input to the pointer information is detected;

controlling to acquire image data of the second landscape from a second server on the network different from the first server from which the image data of the first landscape was acquired, and to display the image data of the second landscape in substitution for the image data of the first landscape;

calculating, when the geographical relationship data associated with the second landscape does not include any network identifier of geographical relationship data associated with another landscape, and the geographical relationship data associated with the first landscape includes direction information associated with the second landscape and direction information associated with a third landscape which has a geographical relationship with the first landscape, direction information to image data of the third landscape with respect to the image data of the second landscape on the basis of the direction information associated with the second landscape and the direction information associated with the third landscape; and generating geographical relationship data associated with the third landscape, which includes the calculated direction information and network identification information required to identify the image data of the third landscape.

13. A computer readable storage medium on which is stored a computer program for making a computer execute a method for implementing walkthrough display by displaying a plurality of image data held on a network in turn, comprising:

acquiring image data of a first landscape from a first server on the network on the basis of geographical relationship data which includes a network identifier required to identify the image data of the first landscape and direction information associated with the direction of a presence of a second landscape with respect to the first landscape;

displaying the image data of the first landscape together with pointer information that suggests a geographical relationship of the first landscape to the second landscape based on the geographical relationship data;

detecting an input to the pointer information;

updating the geographical relationship data when the input to the pointer information is detected;

controlling to acquire image data of the second landscape from a second server on the network different from the first server from which the image data of the first landscape was acquired, and to display the image data of the second landscape in substitution for the image data of the first landscape;

calculating, when the geographical relationship data associated with the second landscape does not include any network identifier of geographical relationship data associated with another landscape, and the geographical relationship data associated with the first landscape includes direction information associated with the second landscape and direction information associated with a third landscape which has a geographical relationship with the first landscape, direction information to image data of the third landscape with respect to the image data of the second landscape on the basis of the direction information associated with the second landscape and the direction information associated with the third landscape; and generating geographical relationship data associated with the third landscape, which includes the calculated direction information and network identification information required to identify the image data of the third landscape.

* * * * *